April 28, 1970     N. F. GUICHET     3,508,333
DENTAL CLUTCH FABRICATION
Filed March 22, 1967     2 Sheets-Sheet 1
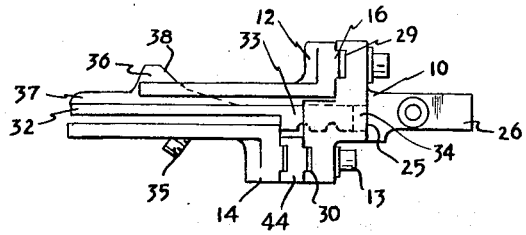
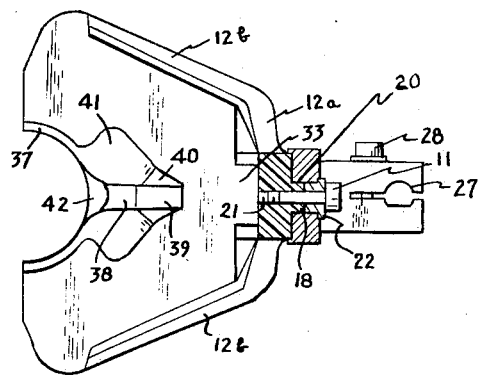
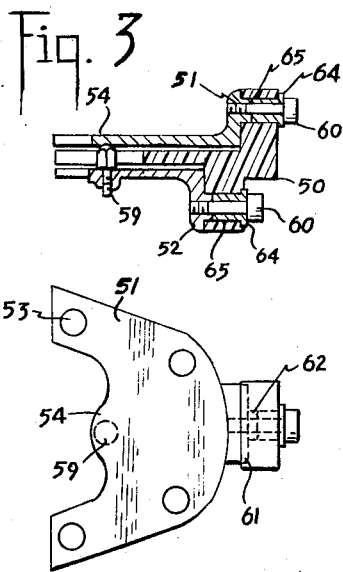
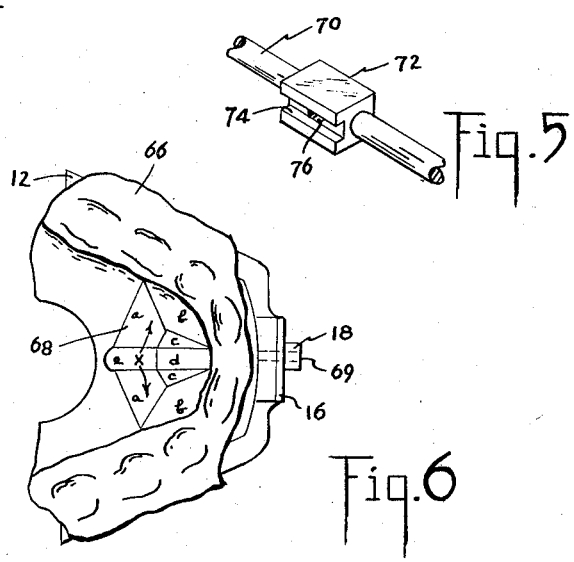
INVENTOR.
Niles F. Guichet
BY
ATTORNEY

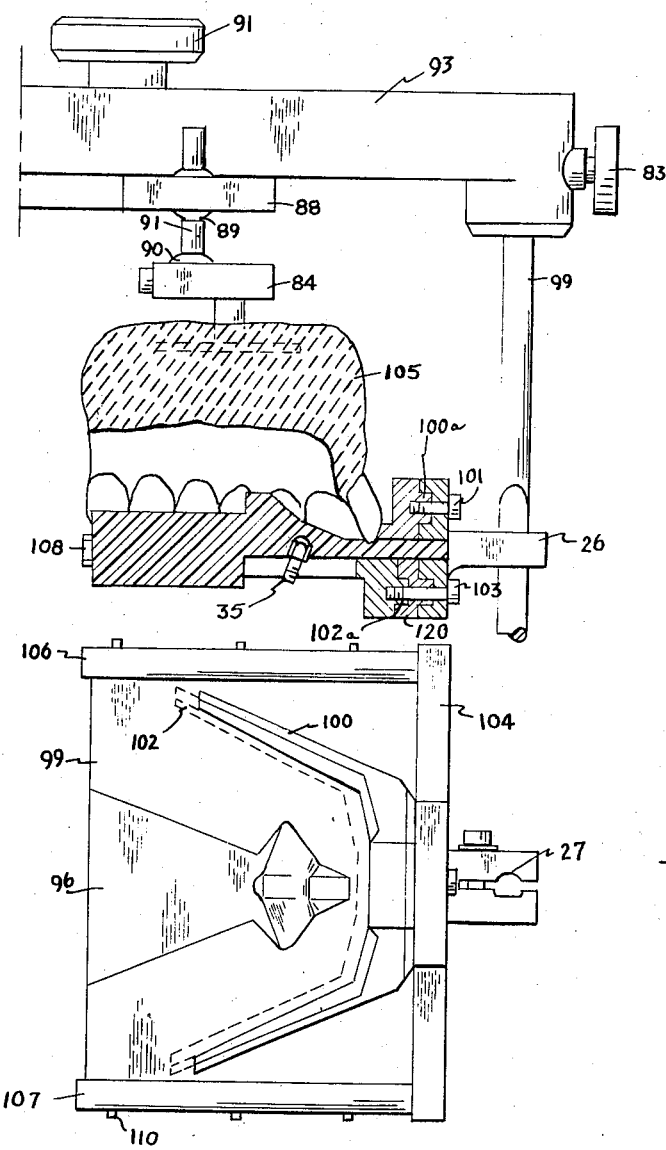
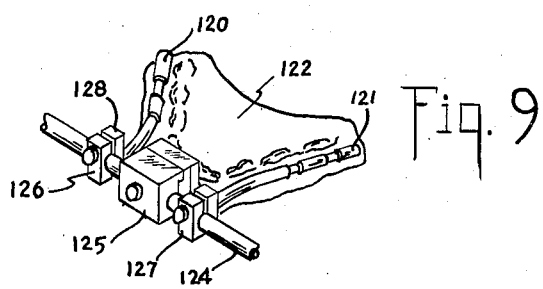

United States Patent Office 3,508,333
Patented Apr. 28, 1970

3,508,333
DENTAL CLUTCH FABRICATION
Niles F. Guichet, 320 Olympia Place,
Anaheim, Calif. 92806
Continuation-in-part of application Ser. No. 389,240,
Aug. 10, 1964. This application Mar. 22, 1967, Ser.
No. 625,213
Int. Cl. A61c 17/04
U.S. Cl. 32—32
8 Claims

ABSTRACT OF THE DISCLOSURE

A jig for the simultaneous casting of maxillary and mandibular clutches that maintains the clutches at fixed and predetermined positions to each other with a minimum of vertical separation. Adaptions are provided for direct casting on a patient's teeth or the casting on the models of the teeth supported in a dental articulator.

---

This application is a continuation-in-part of my co-pending application Ser. No. 389,240, now Patent 3,359,-639.

This invention relates to an improved method and means for the fabrication of dental clutches. In a preferred embodiment, this invention relates to an intra-oral dental clutch jig for the direct casting of dental clutches in a patient's mouth.

Dental clutches are conventionally fabricated from the cast or models of teeth which are mounted in a dental articulator. The conventional method therefore requires obtaining a negative impression of the teeth, casting a model of the teeth from the impression and mounting the dental cast in a dental articulator. The clutches, i.e., negative castings of the teeth, are used to support gnathological equipment such as dental face bows or tracing devices on the patient when recording the patient's jaw movements. Conventionally, a dished bearing plate is centrally mounted in the upper clutch to rest on a bearing pin located beneath it in the lower clutch. In the fabrcation of the clutches on a dental articulator, a sheet of plastic film or metal foil is placed around the models and the upper and lower clutch forks, the upper bearing plate and the lower pin support are then held between the models. The articulator is closed to centic and, then, while steadying the aforementioned clutch parts by hand, a cold-curing plastic is poured around the models to cast an intaglio mold thereof in which the clutch forks and bearing surfaces are imbedded.

The aforedescribed method is very time-consuming and requires a high degree of manual dexterity to properly position all the clutch parts, i.e., the upper and lower fork, the bearing pin support and the upper bearing plate, and to maintain the position of these parts during casting of the clutches. Additionally, the conventional dished bearing plate used in the upper clutch readily encourages undesired protrusion of the patient's jaw when recordings of the lateral excursions are made, thereby making it difficult to secure a purely lateral excursion.

It is an object of this invention to provide an improved method and means for forming dental clutches.

It is also an object of this invention to provide an improved means for fabrication of dental clutches on an articulator.

It is an additional object of this invention to provide an improved method and means for the intra-oral fabrication of dental clutches directly from the patient's teeth.

It is a further object of this invention to provide a dental clutch fabrication jig that permits simultaneous casting of the maxillary and mandibular clutches.

It is an additional object of this invention to provide a clutch fabrication jig for the intra-oral casting of dental clutches for both partially and completely edentulous patients.

It is a further object of this invention to provide an improved dental clutch having a bearing surface that discourages protrusive movement during lateral excursion of the patient's jaw.

It is also an object of this invention to provide dental clutches having improved means for indexing and mounting of the clutch to a dental appliance.

Other and related objects will be apparent from the following description of the invention.

My invention will now be described by reference to the figures of which:

FIGURES 1 and 2 illustrate the clutch fabrication jig for use on dentulous or partially edentulous patients;

FIGURES 3 and 4 ilustrate the clutch fabrication jig for use on a completely edentulous patient;

FIGURE 4 illustrates the mounting means on gnathological instruments used to index and secure the dental clutches to these instruments;

FIGURE 5 illustrates a lock on a dental appliance to engage the clutches of my invention;

FIGURE 6 illustrates the underside of a typical maxillary clutch;

FIGURE 7 illustrates a portion of a dental articulator with my clutch fabrication jig adapted for attachment thereto;

FIGURE 8 illustrates a plan view of the jig shown in FIGURE 6; and

FIGURE 9 illustrates the use of clutch anchors with the dental clutches of my invention.

Referring now to FIGURE 1, there is illustrated a clutch fabrication jig 10 supporting an upper dental clutch fork 12 and a lower dental clutch fork 14. Each fork as shown in FIGURE 2 has a generally U-shape with a bight 12a and dependent sidearms 12b, lying in a substantially flat plane. The bight has a flat anterior face that is generally perpendicular to the plane and carries index means that mate with cooperating means on the jig to orient the fork in a fixed and predetermined position relative to the jig. The index means comprises key 16 that engages track 29 of the jig. The lateral orientation of the fork is achieved by boss 18 which projects past the face of key 16 into bore 20 of the jig. The fork also has means that permits its removable mounting to the jig which comprises tapped bore 21 which is threaded by screw 11. This screw extends through metal washer 22 carried on the jig. The metal washer is employed for reinforcements since in the preferred embodiments jig 10 is formed of plastic such as nylon, Teflon, etc. and forks 12 and 14 are also of plastic such as a polyolefin, nylon, polystyrene, polymethyl methacrylate, etc.

The jig illustrated in FIGURES 1 and 2 comprises a plate 25 with a support arm 26 extending from its rear face. This arm is used to hold the jig in the mouth when directly casting the clutches and also can be used to secure the jig to the articulator and incisal pin when casting the clutches for models of the teeth. To permit locking the jig to an incisal pin of an articulator, arm 26 is bored at 27 and slotted as shown in FIGURE 2. A screw 28 extends through the slot to compress the bore sidewalls against the incisal pin which has a segmented shaft to index with the flat side of the bore 27.

The opposite face of plate 25 has the aforementioned cooperative means that mate with the fork index means such as key 16. The cooperative means comprise tracks 29 and 30 which are at predetermined positions relative to each other to orient the upper and lower forks into the proper vertical separation. The bore 20 for the upper fork and the similar bore for the lower fork are so located in regard to the mating bosses of the forks that these forks are retained in lateral alignment when mounted on the jig. As shown the bosses and bores are on the centerline of the assembly.

In the casting of clutches with the jig illustrated in FIGURES 1 and 2, both clutches are simultaneously cast and it is therefore necessary to impose a separation plate between the upper and lower clutches to prevent the plastic used in forming these clutches from bonding together. Such a separation plate is illustrated as 32 in the clutch jig used for the dentulous or partially edentulous patients. This separation plate is a generally flat plate formed of a soft flexible material, e.g., soft rubber, and has a tongue 33 which extends into a recession 34 on the face of plate 25. This tongue can be notched on its underside to provide an index indicating the degree of retraction of the tongue in the recession 34.

The clutch separation plate 32 also serves as a die for the casting of the proper surfaces on the underside of the maxillary clutch and serves to hold the center bearing pin 35. The upper end of pin 35 projects into a mating hole in clutch separation plate 32 in the same manner and to the same depth as it is shown in plate 99 of FIGURE 7. This position of the clutch bearing pin will insure that it is contiguous to the underside of the bearing surface molded in the maxillary clutch.

Conventionally a dished bearing surface is centrally positioned in maxillary clutch and bearing pins are mounted in the mandibular clutch to form a movable support which separates the clutches at any desired vertical separation. Heretofore no convenient means were provided for casting of these surfaces and casting of the bearing pin in the clutches. Precision orientation of the surface and the bearing pin has not been possible because of the lack of a universal jig and because the clutches heretofore have been separately formed. Precision casting and orientation of the bearing pin to the dished bearing surface on the underside of the maxillary clutch is achieved by my invention because the fabrication jig of my invention prevents the simultaneous casting of both the maxillary and mandibular clutches while casting the desired bearing surface on the underside of the maxillary clutch and also while supporting the separation pin 35 in the mandibular clutch.

The preferred embodiment of my invention molds a bearing surface into the underside of the maxillary clutch which has a shape that will discourage protrusive movement of a patient's jaw during lateral excursion. This insures the proper jaw movements when the clutches are secured to gnathological instruments. The proper shape is achieved by die 36 which comprises a raised portion in the anterior central region of clutch separation plate 32. The generally semicircular raised wall 37 is used to retain the casting plastic about the periphery of the clutch to insure that the teeth are properly embedded in the plastic. The die for casting of the bearing surface in the maxillary clutch is located anteriorly of this wall 37. The die comprises a central track having two inclined center tracks 38 and 39. The inclination of track 39 is from 5° to 25°, preferably about 16°; that of 38 is from 30° to 45°, preferably about 35°; as shown in FIGURE 1. Triangular shaped wings 40 are at each side of track 39 and these wings are inclined downwardly to the base of surface 32. Similarly, wings 41 are positioned at either side of track 38 and a flat plateau 42 is positioned at the posterior end of track 38. To facilitate the illustration, the wings and tracks are shown with sharp juncture lines. In practice, however, these surfaces are blended together with rounded edges to provide smooth transition between the surfaces. The effect of the die and molded surface in the maxillary clutch will be described in greater detail in reference to FIGURE 6 which illustrates the underside of the maxillary clutch cast with this fabrication jig.

The anterior-posterior i.e., longitudinal, relative positions of the upper and lower clutches can be varied as desired in accordance with my invention by the use of spacers 44 illustrated in the mounting of the mandibular clutch 14 to plate 25. These spacers can be employed on the maxillary clutch to provide the proper anterior-posterior positioning of these two clutches to accord for the overbite of patients. In the preferred embodiment illustrated in FIGURE 1, plate 25 has an offset posterior surface as shown. This is provided to be in substantial conformity to the overbite exhibited by most patients. The offset of the surfaces is about 3/16–3/8 inch. A plurality of spacers 44 of varied thickness from about 1/8 to about 1/4 inch can be used for maximum flexibility to thereby provide offset spacing of these clutches from about 1/8 to about 5/8 inch.

The clutch fabrication jig for entirely edentulous patients is illustrated in FIGURE 3. In this illustration the jig comprises plate 50 which supports upper and lower clutch plates 51 and 52. The upper plate is shown in FIGURE 4 as a generally flat plate having a plurality of holes 53 which provide an improved gripping surface for the plastic which is cast on the clutch plate. The upper clutch plate can also have the underside of its surface formed with the bearing surface previously described. The embodiment illustrated, however, shows centrally located lip 54 with a flat undersurface. Plates 51 and 52 can also be used on jig 10.

The lower or mandibular clutch plate 52 supports the bearing pin 59 which is threaded into a bore in the posterior portion of this plate. This position is illustrated by the hidden object lines of FIGURE 4. The clutch plates are removably mounted on the jig support 50 by screws 60 that extend through metal washers 64 in the jig 50 and engage threaded bores in the upper plate 51 and lower plate 52. The clutch plates are oriented in the proper vertical and lateral position relative to each other by the indexing means similar to those described in the partially edentulous jig of FIGURES 1 and 2. This indexing means comprise a key 61 which extends into a mating track on the posterior surface of the jig 50. A boss which, preferably, is centrally located as shown by 62 extends into the bore 65 in the upper and lower side of jig 50. This boss insures the proper lateral positioning of the clutch plates 51 and 52.

The underside of a clutch fabricated by the partial edentulous means of FIGURES 1 and 2 is illustrated in FIGURE 6. This clutch is shown cast on fork 12 to have a generally U-shaped flat undersurface 66 with a concave centersurface 68. The concave centersurface can assume a variety of shapes provided that at any point on this surface other than on the centerline the angle of inclination of the sidewalls be greater in a longitudinal than in a lateral direction. Along the centerline, however, the angle of inclination is greater in a lateral than in a longitudinal direction. As illustrated, surfaces *b* are generally flat, triangular extensions of surface 66. Surfaces *d* and *e* form a central track having an initial incline of about 16°, surface *d*, and a final incline of about 35°, surface *e*. Surfaces *c* define steep sidewalls on either side of track *d* and surfaces *a* form more shallow sidewalls on either side of track *e*. Point *x* on track *e* indicates the centric position of center bearing pin 35 when the clutches are in the patient's mouth. Upon lateral excursion, the broken line indicates the path of the bearing pin which follows the path of least resistance along shallow sidewalls *a*. Any protrusive movement is discouraged by the pitch of surfaces *a* which are steeply oriented against forward motion. The steepness of these surfaces is propioceptively sensed by the patient and avoided, thereby avoiding forward movement during lateral excursion. Similarly, a pure protrusive movement is assured by the steep inclines of surfaces *a* and *c* on either side of track *e*.

The indexing means of the maxillary clutch is also shown in FIGURE 5 as key 16 having projecting from its anterior surface boss 18. These are provided with a threaded bore 69 which receives the screw such as 11 or 13 when the clutch is supported on the jig 10. The aforementioned clutches are used with conventional panographs or with the panograph described in my copending application Ser. No. 348,013. To achieve a fixed position of the crossbows, a mounting block having a key track to fit the key 16 of the clutches is permanently affixed to the center of the crossbars of the face bows. FIGURE 5 illustrates the bar of the crossbow 70 and a mounting block 72 which is used to removably mount the clutches in a fixed and predetermined orientation to a face bow such as that shown in my copending application Ser. No. 348,013, now Patent 3,431,649. This block has a track 74 which mates with key 16 and thereby insures the exact or proper vertical orientation of the clutch to the face bow. A central bore 76 is provided to receive boss 18 and thereby achieve the proper lateral orientation of the clutch. The bore continues through the block 72 and a screw, not shown, is slid through this bore to engage the threaded tap 69 in the clutch illustrated in FIGURE 5.

The aforementioned mounting means provides a substantial improvement over that conventionally employed in panograph assemblies. Conventionally, clutches are secured to face bow assemblies by being provided with a projecting rod that extends anteriorly of the clutch and is clamped to the crossbar of the face bow with a suitable block clamp. This assembly, however, increases the vertical separation between the clutches when the tracing device is placed in a patient's mouth since the face bows are separated by the thickness of the face bow crossbars, the thickness of the projecting rod from the dental clutch as well as the necessary spacing of the block clamp. In the improved mounting means of my invention, however, the face bows are positioned in very close proximity to the clutches and minimum vertical as well as lateral separation is achieved.

Referring now to FIGURES 7 and 8, the mounting of the clutch fabrication jig and the casting of clutches from models mounted in an articulator will be described. The articulator employed is preferably that described in parent application 389,240. In this articulator the models are supported by universal mounting means that comprises plates 84 and 88 which are secured together by rods 91 which are attached by universal ball joints 89 and 90. The upper arm of the articulator is illustrated as 93 and has hand screw 91 for securing plate 88 to the articulator in mounting of the dental models. Incisal pin 99 is secured in the articulator by screw 83. The clutch fabrication jig is secured to this pin by use of the projecting arm 26 described in regard to FIGURES 1 and 2 which has the flat-sided bore 27 that indexes and removably grips pin 99.

The clutch fabrication jig described in FIGURES 1 and 2 can be used directly on the articulator in the manner described in regard to FIGURES 1 and 2. The fabrication jig described in my parent application can also be used as shown in FIGURES 6 and 7. This jig is essentially the same as that described in regard to FIGURES 1 and 2, however, different means are provided for supporting of the clutch separation plate in the jig 104. This jig has slots 108 to support the clutch separation plate 99. This plate 99 serves the same functions as that described in regard to FIGURES 1 and 2, i.e., prevents the mixing of the plastic of the upper and lower clutches, casts the desired surface in the underside of the maxillary clutch, and orients the bearing pin in the proper position in the mandibular clutch. A preferred shape of this separation plate is illustrated as 96 and is substantially identical in shape to that described in regard to FIGURES 1 and 2 so that the desired concave surfaces of the maxillary clutch described in regard to FIGURE 6 can be achieved. Bearing pin 35 is also illustrated as mounted within a bore in the underside of plate 99. The model 102 of the teeth is shown in its proper position within the confines of the upper clutch fork 100. The upper clutch 100 and lower clutch 102 are mounted in a removable and indexing mount to the plate of jig 104 in the same manner as described in regard to the mounting jig of FIGURES 1 and 2. This means is illustrated as keys 100a and 102a which engage tracks cut into the posterior surface of plate 104 or spacer 120. Again, the proper lateral orientation of the clutches is secured by threaded taps in the clutches and mounting plate which mate with bores in the plate of jig 104 through which mounting screws 101 and 103 extend. Proper orientation of the upper and lower clutches 100 and 102 is achieved by the use of screws 101 and 103 which extend through bores in the plate of jig 104 and engage centrally located threaded taps in the forks 102 and 100. The keys 100a and 102a are preferably integrally formed with the clutches in the manner illustrated in regard to FIGURES 1 and 2.

In the casting of the clutches a parting agent such as a film of a plastic or metal foil or a liquid which dries and provides an adhesive coating, e.g., a silicone in a volatile liquid solvent, is placed about the jig assembly when the clutches are cast. To attach a film to the mounting jig, several pins 110 are placed on the outer edges of tubes 106 and 107 and these pins are inserted through perforations in the film to hold it in place. The outer end of the pins can be pointed if desired to avoid the necessity to perforate the film prior to use. Preferably the end of the pins is slightly enlarged to form a lip that prevents accidental removal of the film.

The use of the fabrication jigs of my invention should be readily apparent from the preceding description. In use, the intra-oral clutch fabrication jig described in FIGURES 1 through 4 is loaded with the cold-curing plastic, e.g., the polyacrylic, and the plastic is permitted to set to a moldable consistency. The clutch jig is then inserted in the patient's mouth while the patient's jaw is guided into a terminal hinge closure to obtain the desired impressions of the teeth in the cold-curing plastic which preferably is permitted to cure to a hard consistency in the patient's mouth. The patient's mouth is then opened and the clutch fabrication jig with the intaglio impression of the teeth is removed. Thereafter the clutches are removed from the fabrication jig and the center bearing screw 35 is adjusted to provide the proper height to achieve about 1 millimeter clearance between the clutches when the mandible is in the terminal hinge position. Because the clutches are simultaneously cast while in a precise orientation to each other, no difficulty is experienced when the clutches are thereafter used to mount dental appliances to the patient's teeth. Because the dental clutches are cast with a minimum vertical separation between the maxillary and mandible, dental appliances can be mounted with a minimum vertical separation in the patient's mouth, thereby permitting the recording of precise tracings of the patient's mandible. In this regard the precision index "mounting" means of the clutches which avoids the crossbar and clamp locks heretofore employed permits the use of dental appliances with minimum vertical separation between the maxillary and mandible, thereby promoting precision tracing of the mandible excursions.

The clutches can be firmly secured to the teeth to support dental appliances such as a hinge axis locator which require vertical separation of the teeth during use. To lock the teeth to the appliance, the clutches are plastered to the teeth using clutch anchors. FIGURE 9 illustrates the clutch anchors 120 and 121 which comprise a curved bar positioned tangent to the buccal surfaces of the posterior teeth. The clutch 122 is shown secured to the crossbar 124 of the dental appliance with indexing lock 125 similar to that of FIGURE 6. The anchors 120 and 121 are also secured to the crossbar 124 by block clamps 126 and 127 which are of a split block construction with a screw that binds the block to the crossbar. The rear portion 128 of the split block is secured to the curved rod; preferably this an integral unit of cast aluminum. In use, quick setting dental plaster is loaded on the lingual surfaces of the clutch anchors and the anchors and clutch are placed in the mouth so that the buccal surfaces of the teeth engage the plaster. When the plaster has set, the clutch is then firmly anchored to the teeth and the dental appliance can be placed on crossbar 124.

I claim:
1. The combination useful in the formation of dental clutches that comprises:
    (1) a clutch support jig having first and second supports at fixed relative positions thereon;
    (2) a first dental clutch support means removably mounted in the first of said supports with index means to orient said support means to a fixed, predetermined position on said jig;
    (3) a second dental clutch support means removably mounted on the second of said supports with index means on said second dental clutch support means to orient said second support means at a parallel and predetermined and fixed vertical, lateral and longitudinal relative position to said first support means; and
    (1) a clutch separation plate supported by said jig and extending across substantially the entire area between said first and second support means.

2. The combination of claim 1 wherein said separation plate has a bearing surface mold comprising a raised central surface on one side thereof and means on its opposite side opposite said central surface to removably support a bearing pin at a predetermined fixed position relative to said raised central surface.

3. The combination of claim 1 including a spacer removably positioned between said second dental clutch support means and said jig to provide a controlled and measured change in the longitudinal position of said second dental clutch support means relative to said first dental clutch support means.

4. The combination of claim 1 wherein said index means comprises key and track means on said dental clutch support means and said support jig.

5. The combination of claim 1 wherein said clutch separation plate is removably mounted on said jig.

6. The combination of claim 5 wherein said clutch separation plate has an anterior tongue projecting into a recessed portion of said support jig for supporting said separation plate by said jig.

7. A clutch support fork adapted for support of dental impressions and having an open generally U-shape with a bight and dependent sidearms for positioning adjacent the outside buccal surfaces of a patient's teeth, said sidearms lying in a substantially flat, common plane, said bight having a flat anterior face perpendicular to and extending above said plane, angular, vertical, lateral and longitudinal indexing means on said anterior face at a fixed, predetermined and permanent orientation thereto and means on said face to permit the removable mounting of said fork to dental appliances.

8. A fork of claim 7 wherein said index means comprises key and track means on said fork and the dental appliances.

References Cited

UNITED STATES PATENTS

| | | | |
|---|---|---|---|
| 2,841,871 | 7/1958 | Miller | 32—19 |
| 3,160,955 | 12/1964 | De Pietro | 32—32 |
| 3,321,832 | 5/1967 | Weisberg | 32—32 |

ROBERT PESHOCK, Primary Examiner